United States Patent [19]
Bartholmey et al.

[11] Patent Number: 6,062,426
[45] Date of Patent: May 16, 2000

[54] ICE STORAGE/DISPENSING APPARATUS

[75] Inventors: Don S. Bartholmey, Bellevue; Richard M. Gue, Seattle, both of Wash.

[73] Assignee: North Star Ice Equipment Corporation, Seattle, Wash.

[21] Appl. No.: 09/071,645

[22] Filed: May 1, 1998

[51] Int. Cl.[7] .................................................. B67B 7/00
[52] U.S. Cl. .............................. 222/1; 222/63; 222/234; 222/410
[58] Field of Search ............................. 222/63, 252, 263, 222/64, 234, 1, 410

[56] References Cited

U.S. PATENT DOCUMENTS

| | | |
|---|---|---|
| 670,581 | 3/1901 | Erisman . |
| 1,930,037 | 10/1933 | Brubaker . |
| 2,735,591 | 2/1956 | Branchflower . |
| 3,059,450 | 10/1962 | Mueller et al. . |
| 3,463,362 | 8/1969 | Garber . |
| 5,244,020 | 9/1993 | Bruno et al. ................... 222/410 X |

OTHER PUBLICATIONS

"Ice Handler" Jr. (Model 180) advertisement from LDIndustries, 1995.

"Arrangement Af Brudissilo" schematics from Atlas Danmark, prior to May 1, 1998.

"Geneglace" orbital pictures from Frigofrance, prior to May 1, 1998.

"Menci Silo per Ghiaccio in Scaglie" brochure, prior to May 1, 1998.

"Orbital Ice Storage and Dispensing System" letter and information, Jan. 3, 1998.

"The Importance of Ice Bin Selection" from the Follett Corporation, 1994.

"Ice Rake and Delivery Systems" from North Star Ice Equipment Corporation, prior to May 1, 1998.

Primary Examiner—Gregory L. Huson
Attorney, Agent, or Firm—Christensen O'Connor Johnson & Kindness PLLC

[57] ABSTRACT

An ice storage and dispensing apparatus includes a container (10) defining an inlet aperture (15) for receiving frozen product and an outlet aperture (30) for dispensing frozen product. A platform (16) is movably mounted within a lower end of the container. A rake (18) is rotatably mounted within an upper end of the container. An actuator (26) is mounted within the container between the platform and a support frame at the lower end of the container, and can be activated to selectively move the platform toward or away from the rake. A motor (24) is coupled to the rake for driving rotation of the rake. A torque sensor associated with the motor senses the level of load being applied on the motor as a measure of the proximity of the top layer of stored ice to the rake. A controller controls operation of the actuator in response to the sensor to automatically adjust the position of the platform relative to the rake.

29 Claims, 4 Drawing Sheets

ICE STORAGE/DISPENSING APPARATUS

FIELD OF THE INVENTION

The present invention relates to an apparatus for storing and dispensing frozen product, and particularly, to an apparatus for automatically storing and dispensing ice.

BACKGROUND OF THE INVENTION

Many industries utilize large quantities of frozen, fresh, or sea water ice for refrigeration purposes. These include shipboard and land-based seafood processing plants, grocery stores, and other facilities. Flake ice or cube ice can be manufactured in large capacity by automated ice making machines, which freeze liquid material on a cooling surface and then periodically remove the frozen product in chunks or flakes. One such example is a rotating disk ice machine disclosed in U.S. Pat. No. 5,307,646 to Niblock. Such machines can be operated to produce a continuous stream of frozen product, which typically must be stored in a container until such time that it is to be utilized by the industrial consumer. Thereafter it is necessary to dispense the ice from the storage container.

Many conventional ice making machines operate in conjunction with hoppers, into which ice is dispensed from the ice making machine as it is produced. Once a sufficient quantity of ice builds up in the hopper, the hopper is removed from the machine and the ice may be manually dispensed.

Other ice making machines have been designed to operate in conjunction with automated ice storage systems including a hopper or container in which a mechanized dispensing device is mounted. One such example is an ice rake and delivery system sold by Northstar Ice Equipment Corporation, which includes a container provided with a conveyor-type ice rake that rakes a layer of frozen product from the container on a continuous basis, with the raked product being fed to a discharge device such as a rotating screw conveyor, i.e. an auger. Still other mechanized ice storage and dispensing devices utilize a discharge auger that is orbitally mounted in the bottom of an ice storage bin. The auger sweeps the bottom of the bin to receive and discharge a stream of frozen product. Such auger type storage and dispensing systems are an improvement over manual discharge hoppers, but can be complex and costly to manufacture and maintain.

Other devices have been developed for dispensing ice from containers that utilize a rotating rake. One such device is disclosed by U.S. Pat. No. 3,463,362 to Garber, which utilizes a rotating rake that removes ice from the top of a pile of ice stored within a container. The container includes a platform that is movably mounted within the container, and which is biased upwardly towards the rake by a spring compressed between the platform and the floor of the container. A further example is disclosed by U.S. Pat. No. 2,735,591 to Branchflower, which utilizes a rotating rake having arcuate arms to which a plurality of downwardly projecting teeth are secured. As the arm rotates, it translates longitudinally downward along a shaft at a continues rate, grinding against the top of a pile of ice stored within a container. As the rotating rake moves downwardly, ice is swept to one of a series of discharge doors which open in sequence along the height of the container.

These rotating rake devices are more compact than auger-type devices, but must be manually reconfigured to refill the device after dispensing is completed. Further, adjustment of the rake relative to the platform or floor of the container occurs only in a continuous fashion, as driven either by mechanical linkages or a spring biasing force, without regard to variations in the level of ice within the container or to the degree of resistance being met by the rake.

SUMMARY OF THE INVENTION

The present invention provides an ice storage and dispensing apparatus that includes a container having inlet and outlet apertures for receiving and dispensing frozen product. A platform is mounted within a first end of the container. A rake is rotatably mounted within a second end of the container, adjacent to the outlet aperture. An actuator is operatively connected to either the platform or the rake to selectively move toward or away from the other of the platform or rake. In a preferred embodiment, the actuator selectively moves the platform toward and away from the rake. A motor is coupled to the rake and drives rotation of the rake. A sensor senses an operation parameter indicative of the relationship of frozen product contained within the container to the rake. A controller is included for controlling the operation of the actuator in response to the sensor, to automatically adjust the position of the platform relative to the rake.

In a preferred embodiment of the present invention, the apparatus includes an insulated cylindrical container having an insulated sidewall, an open bottom mounting a support frame, and an insulated cover, through which an inlet aperture is formed as desired to accommodate a given ice making machine. The inlet aperture is located near the top of the cylindrical container, and receives ice product from an ice making machine for storage. The platform automatically moves up within the sidewall to discharge product from an outlet of the container, and automatically moves down as product is added. A rake is rotatably mounted at a fixed elevation near the upper end of the cylindrical container assembly, and rotates in one direction to discharge the product and in an opposite direction to store the product. A switch is selectively positioned by an operator to initiate the discharge or storage mode of operation of the platform and rake. The rake includes a plurality of radial rake arms that are connected to a central drive shaft and which extend outwardly to near an interior surface of the sidewall. Each rake arm has an arcuate configuration. The central drive shaft projects downwardly through the cover from a gear box that is located on the top of the cover.

An electronic sensor senses the relationship of product stored in the container to the rake by measuring the torque on a drive motor, which drives rotation of the shaft via the gear box. This reading is used to control the longitudinal positioning of the platform relative to the position of the rake. The platform is supported by a scissors-type linkage arm and hydraulic cylinder actuator mounted between the platform and the support platform at the bottom end of the container. The extension and contraction of the actuator is controlled by a supply of hydraulic fluid to the hydraulic piston and cylinder assemblies.

The arcuate rake arms have multiple rake teeth that are attached to and extend down from the bottom of the arms, and are spaced along a radial line from the central drive shaft to the perimeter of the cylindrical container. The teeth are evenly offset and are configured to score into the hard surface of the ice product and break it up into smaller pieces that can be readily moved by the rake arms. The product discharge outlet is integral with the inner surface of the cylindrical container and extends through the upper end of the insulated sidewall. The bottom edge of the product discharge outlet is at substantially the same level as the bottom of the rake arms. The product discharge chute has a tangential lead in to its opening and directs the product downward as it exits the bin.

In a further aspect of the invention, the platform defines a perimeter, to which a fluid seal is attached, providing a sliding seal contact between the perimeter and the interior wall of the container. The fluid seal defines a round cross section portion and a flange portion, and enhances the refrigeration effect and movement of the platform toward or away from the rake.

In a further aspect of the invention, the platform defines an upper surface that supports the received frozen product. The upper surface defines a contour, which in a preferred embodiment is a plurality of radial grooves, to engage the frozen product. These radial grooves engage the frozen product and prevent rotation of the frozen product as a top layer of the frozen product is scraped by the rake in the dispensing process. The radial grooves further provide for drainage of any incidental melt water through a centrally located aperture in the platform.

In a further aspect of the invention, a method is provided for storing and dispensing ice product. The method includes: receiving frozen product through an inlet aperture of a container onto a movable platform mounted within the container; selectively rotating a rake mounted within the container in a first direction for dispensing the frozen product through an outlet aperture of the container; sensing the relationship of the frozen product which is contained within the container to the rake; and automatically moving the platform toward or away from the rake in response to the sensed relationship of the frozen product within the container to the rake.

The result of this construction is an ice storage and dispensing apparatus that automatically adjusts the platform position to maintain the product level immediately under the raking device, providing instantaneous discharge and filling of the container. Additionally, product can be stored at the same time product is being discharged by introducing product through the inlet while also raking ice product out through the outlet.

Further, the arcuate arms of the preferred embodiment are such that when rotating in one direction, the configuration moves the product in a direction from the central drive shaft to the perimeter of the cylindrical container and when rotated in the opposite direction, moves the product in the direction from the perimeter of the cylindrical container towards the central drive shaft, which benefits the ease of storage and dispensing the frozen product.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 2:
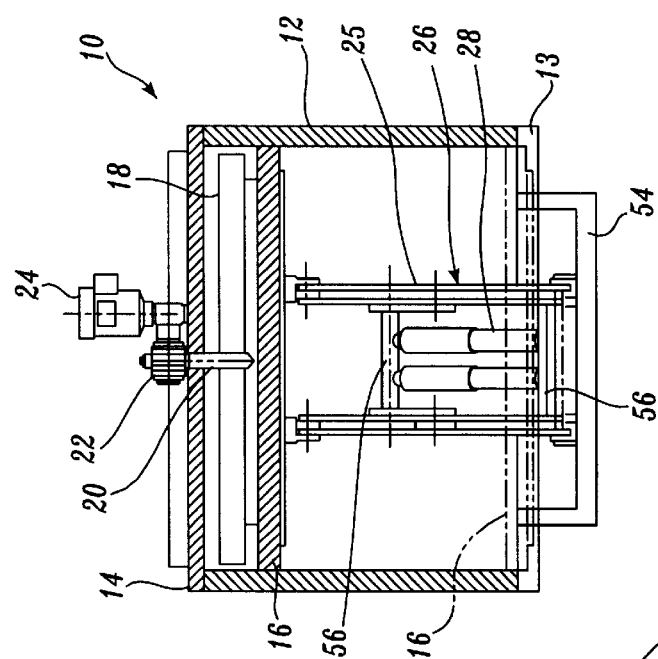
FIG. 2 provides a side view of the ice storage and dispensing apparatus of FIG. 1, with the container and platform shown in cross section.
Figure 3:
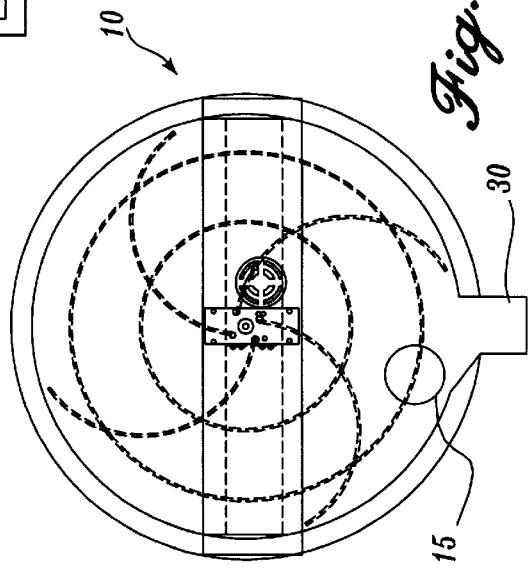
FIG. 3 provides a top plan view of the ice storage and dispensing apparatus of FIG. 1.
Figure 1:
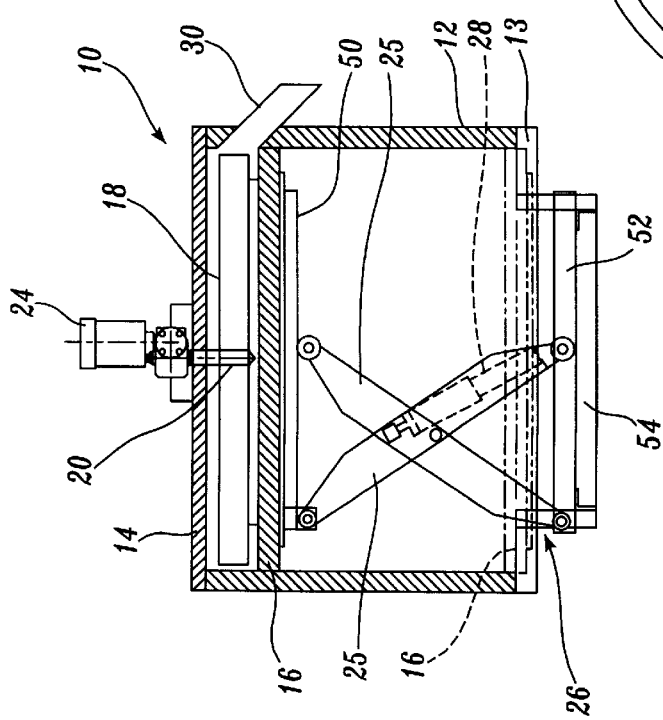
FIG. 1 provides a front view of an ice storage and dispensing apparatus constructed in accordance with the present invention, with the platform and container shown in cross section, the platform shown in solid line positioned at the upper end, and in phantom within the lower end.

A preferred embodiment of an ice storage and dispensing apparatus constructed in accordance with the present invention is illustrated in FIGS. 1, 2, and 3. The apparatus includes a cylindrical, insulated container 10 having a longitudinal insulated sidewall 12, a support frame 13 mounted across the bottom end of the sidewall, and an insulated cover 14. An inlet aperture 15 (FIG. 3) is located near the second end of the cylindrical container and receives ice product from a conventional ice making machine (not shown). The inlet aperture is located as desired to accommodate a given ice making machine, and suitably may be formed through the cover 14. The container 10 further includes an outlet in the form of a discharge chute 30, as shall be described subsequently.

A platform 16, which may be insulated, is disposed within a lower end of the container 10, and can be operated to automatically move up within the sidewall 12 to discharge product, and to automatically move down as product is added to the container. The platform 16 has a circular profile, is aligned on a central axis of the container 10, and is slidably and closely received therein.

A rake 18 is rotatably mounted at a fixed elevation near the upper end of the container 10, and rotates in a forward direction (illustrated in FIG. 3 as counterclockwise) to discharge product and in a reverse direction (clockwise in FIG. 3) to store product, to maximize the utilized ice storage volume. The rake 18 includes a plurality of radial rake arms 32 that are connected to a central drive shaft 20 and extend outwardly to near an interior surface of the sidewall 12. Each rake arm 32 has an arcuate configuration defined along its radial length.

The central drive shaft 20 projects downwardly through the cover 14 from a transmission, such as a gear box 22 which is mounted on the top of the cover 14. The gear box is coupled to a drive motor assembly 24, which includes an electric motor, a torque sensor and a controller including a central processing unit and associated control circuitry.

The sensor mounted within the drive motor assembly 24 a measures the relationship of frozen product in the container 10 relative to the rake by sensing the torque on the drive motor 24. Specifically, the sensed torque provides a measure of the degree of resistance of movement of the rake, which is related to the proximity and degree of engagement of the rake with the frozen product. When the rake arms 32 encounter ice within the container, the load applied to the motor increases, while the load decreases when the level of ice falls below the bottom edge of the rake arms 32. The controller of the drive motor assembly 24 controls the longitudinal positioning of the platform 16 relative to the position of the rake 18 in response to the sensed load. While the preferred embodiment utilizes a torque sensor to determine the ice level within the container 10, other types of sensors could be utilized, such as a strain gage that measures the strain on the rake arms 32.

The platform is supported by a scissors-type actuator 26 that is mounted between the platform 16 and the support frame 13 of the container 10. The actuator 26 includes two sets of double cross-bar linkages 25. Each linkage 25 has an upper end connected to a corresponding flange 50 mounted on the underside of the movable platform 16, and a lower end connected to a flange 52 mounted within a recessed center portion 54 of the support frame 13. Each pair of linkages 25 is pivotably joined at the center. As viewed in FIG. 1, the left upper end of one linkage 25 and the left lower end of the other linkage 25 of each pair is pivotably pinned to the flanges 50, 52, respectively. The opposing ends of the linkages 25 carry rollers which roll on the flanges 50, 52 as the actuator 26 is raised and lowered. The extension and contraction of the scissors-type actuator 26 is controlled by a supply of hydraulic fluid to hydraulic piston and cylinder assemblies 28 mounted on upper and lower cross-braces 56 between the pairs of linkages 25. Extension or contraction of the actuator 26, as controlled by the controller in response to the sensed torque from the drive motor assembly 24, raises or lowers, respectively, the platform 16 within the container. The platform 16 is thus automatically positioned during discharge or filling of ice into the container to ensure that ice product is always located immediately below the rake 18.

Figure 4:
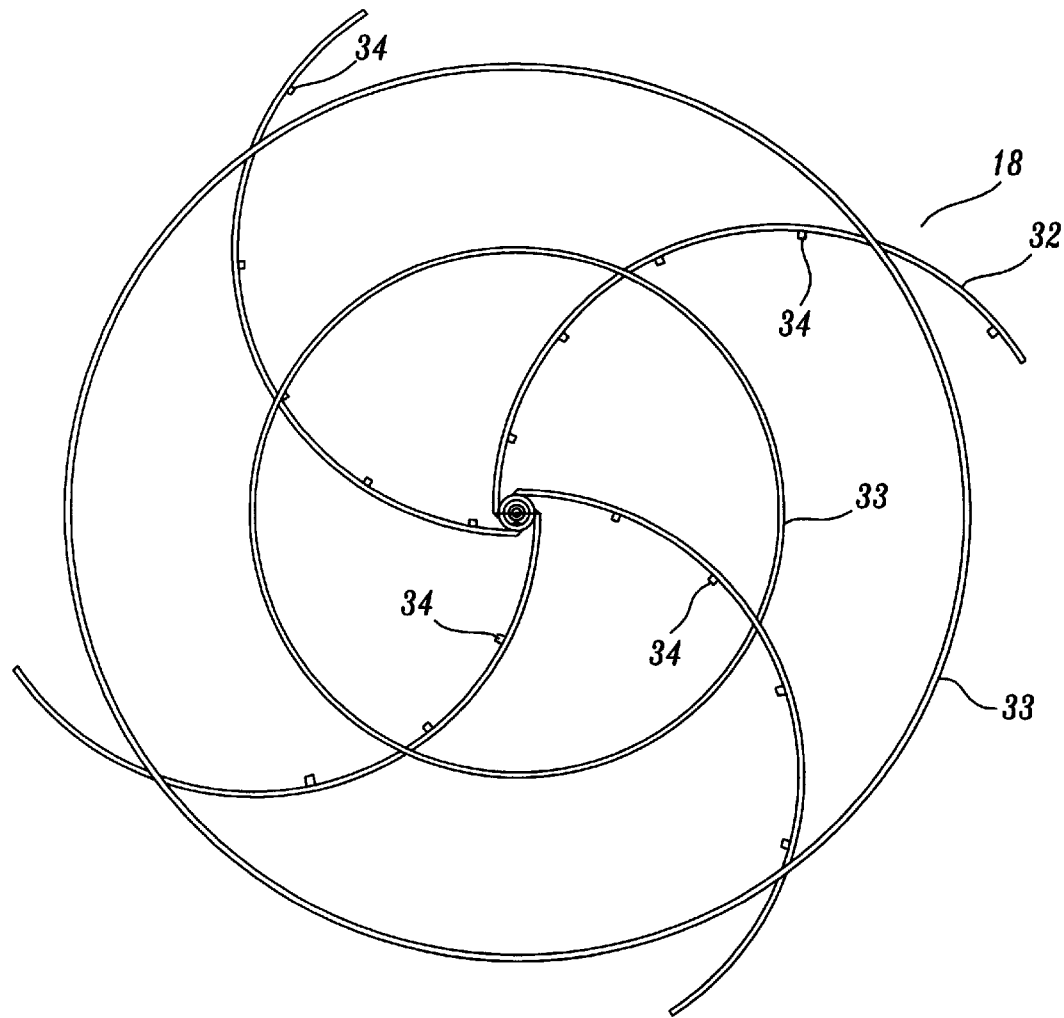
FIG. 4 provides a top plan view of the arcuate rake of the apparatus of FIG. 1.

The rotatably mounted rake 18 is located within the upper end of the container 10 adjacent the outlet aperture 30, and selectively rotates in the forward direction to discharge the product and in the reverse direction to store the product. In the forward direction, the rake 18 scrapes against the stored ice product to dislodge and sweep away an upper layer of product for dispensing through the outlet aperture 30. The rake also impinges on the ice while rotating in the reverse direction to spread the ice out during filling of the container, which maximizes the utilized volume of storage within the container. As can be seen in FIGS. 3 and 4, the rake 18 defines a plurality of radially extending arcuate arms 32. The arms 32 are supported by a series of concentric circular frame members 33, which are suitably joined to the arms 32 by welding.

Figure 5:
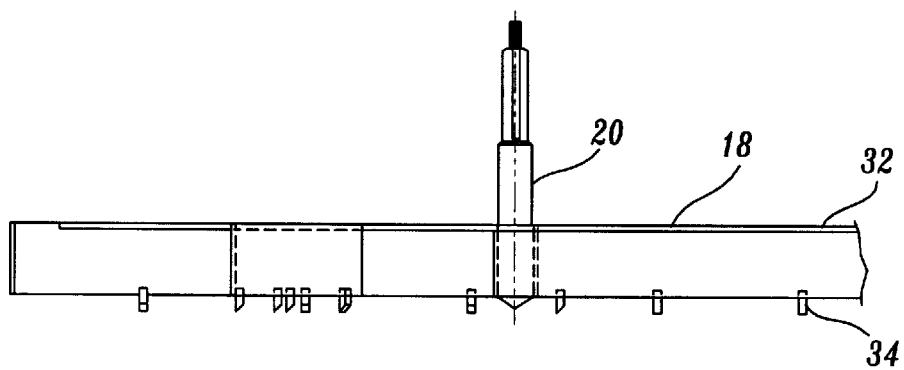
FIG. 5 provides a partial side view of the rake of FIG. 1.
Figure 6:
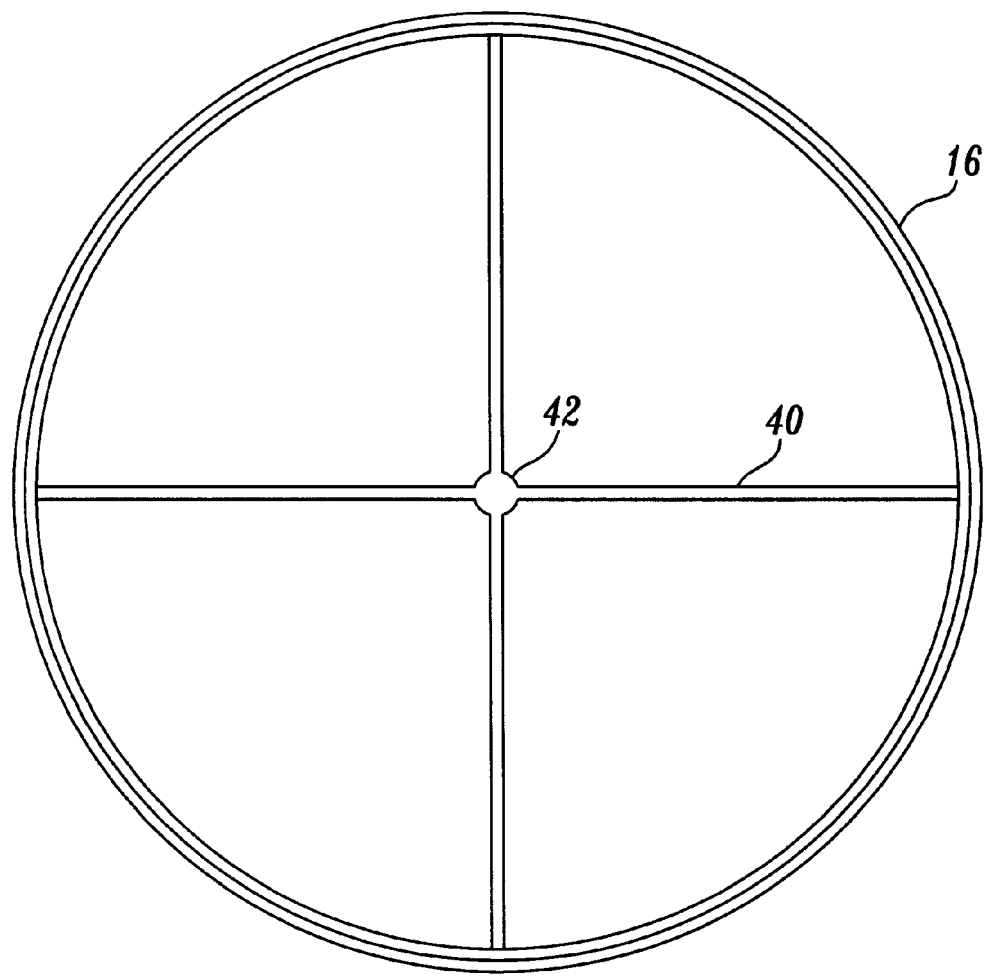
FIG. 6 provides a top plan view of the platform of the apparatus of FIG. 1.
Figure 7:
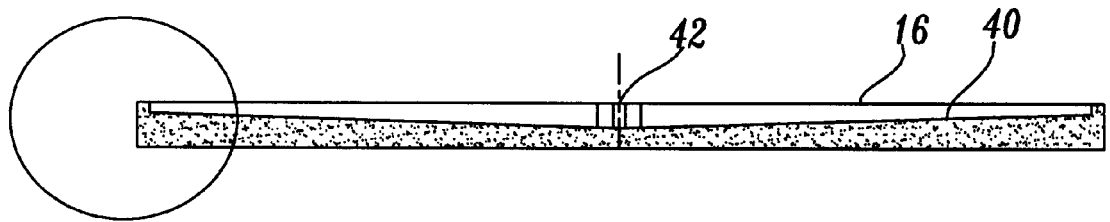
FIG. 7 shows a diametric cross section of the platform of FIG. 6.
Figure 8:
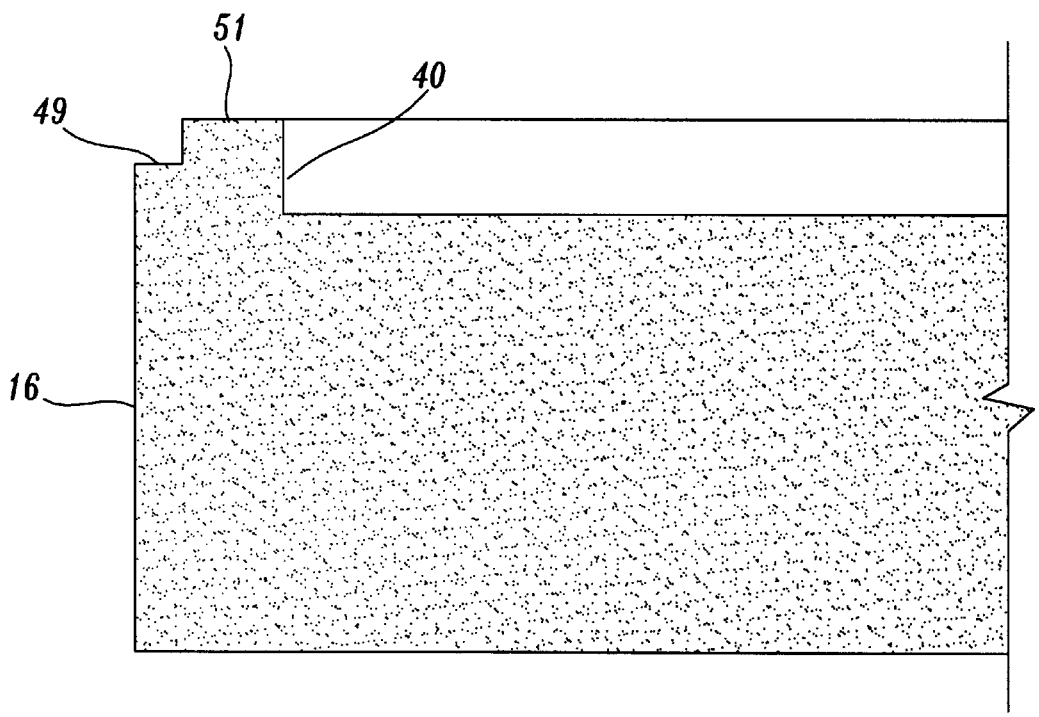
FIG. 8 shows a detailed diametric cross sectional view taken from FIG. 7 showing the edge profile of the platform.

The arcuate rake arms 32 carry multiple ice-scraping teeth 34 that depend downwardly from the arms 32, and that are spaced evenly along a radial line from the central drive shaft 20 to the perimeter of the cylindrical container 10. The teeth 34 are configured to score into the hard surface of the ice product and break it up into smaller pieces that can be readily moved by the rake arms 32 (FIG. 5). The teeth 34 are offset on each arm 32 to form uniformly spaced concentric circle pattern from the center, producing even breaking of frozen product. FIG. 4 shows the disposition of the teeth 34 on the concave side of the arms 32. The teeth 34 are positioned to allow easy movement of frozen product across the convex face of the rake arms 32. An alternate arrangement (not shown) is for the teeth 34 to depend from the bottom surface of the arms 32 so that they do not inhibit the flow of ice along the arm.

The product discharge chute 30 is defined through the upper end of the sidewall 12 of the container 10. The bottom edge of the product discharge outlet 30 is at substantially the same elevation as the bottom edge of the rake arms 32. The product discharge outlet 30 has a tangential lead in to its opening (FIG. 3) and directs the product downward as it exits the container 10.

The arcuate configuration of the arms 32 are such that when rotating in one direction, product is moved in a direction from the central drive shaft 20 to the perimeter of the cylindrical container 10, and when rotating in the opposite direction, product is moved in a direction from the perimeter of the container 10 towards the central drive shaft 20. The convex curvature of the rake arms 32 is used to move product outwardly toward the discharge outlet 30 when the rake 18 is rotating in the forward direction. Conversely, the concave curvature of the rake arms 32 is used to move product inwardly when the rake is rotating in the opposite direction for storage. When the apparatus is operated in the storage mode, ice introduced through the inlet aperture 15 is swept nearly a full 360 degrees, moving inwardly into the container, before reaching the discharge chute 30 (FIG. 3), and thus is retained within the container 10 and spread to and even level. The arcuate nature of the arms 32 thus enhances the ease of storing and dispensing frozen product.

Figure 9:
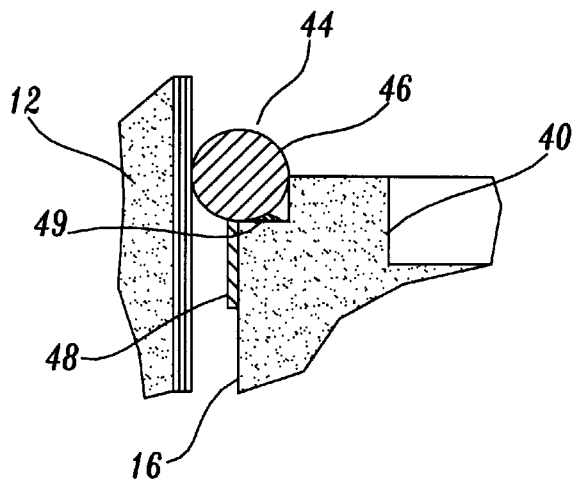
FIG. 9 shows a detailed diametric cross-sectional view of the liquid seal on the perimeter of the platform of FIG. 7 in relation to the inner wall of the container.

Referring to FIGS. 6, 7, 8, and 9, the platform 16 defines a circular perimeter, to which a fluid seal 46 is attached, which provides sliding sealing engagement between the perimeter and the interior wall 12 of the container 10. As can be seen in FIG. 9, the fluid seal defines an annular round cross sectioned portion 44 and an annular flanged portion 48. The flanged portion 48 is adhered to the perimeter of the platform 16, while the round portion 44, which serves as an integral O-ring, is seated in an annular recess 49 defined about the upper edge of the perimeter. The round portion 44 is compressed between the wall 12 and platform 16 to create a fluid tight seal, which enhances the refrigeration effect and movement of the platform 16 toward or away from the rake 18. In addition to prevent air leakage and attendant heat transfer past the perimeter of the platform 16, the seal 46 prevents any incidental melt water from seeping past the platform 16. This sealing thus prevents melt water from building up below the platform 16, or from refreezing at a location that may inhibit longitudinal positioning of the platform 16.

The platform 16 defines an upper surface that supports the received frozen product. The upper surface is bordered by an annular raised lip 51 (FIGS. 8 and 9).The upper surface of the platform that is surrounded by the lip 51 is preferably sloped slightly towards the center Referring to FIG. 6, the upper surface defines a vertical contour to engage the bottom surface of the stored ice product mass. In the preferred embodiment this contour consists of a plurality of radial grooves 40 defined in the upper surface of the platform 16 The grooves 40 engage the frozen product to prevent rotation of the mass of frozen product on the platform 16 as a top layer of frozen product is scraped by the rake 18 in the dispensing process. The grooves 40 are formed to slope centrally toward a central drain aperture 42, which provides for drainage of any melt water through the platform 16.

The torque sensor associated with the drive motor assembly 24 electronically senses the load being applied to the drive motor at any instant in time, which is an operation parameter indicative of the relationship of the frozen product within the container to the rake. As previously described, the drive motor is coupled to the rake 18 and drives the rotation of the rake 18. The load applied to the drive motor indicates the degree of engagement of frozen product by the rake 18 The controller associated with the torque sensor automatically controls the extension or contraction of the actuator 26, by responding to sensed loads that are outside of predetermined maximum or minimum load thresholds, to automatically adjust the position of the platform 16 relative to the rake 18. The extension and contraction of the scissors-type actuator 26 is controlled by a supply of hydraulic fluid to the hydraulic piston and cylinder assemblies 28. The pneumatic hydraulic position and cylinder assemblies 28 are single-acting hydraulic cylinders that supply fluid to create upward movement and release pressure to move downward under gravity force.

When the apparatus is initially filled prior to usage, the controller causes the actuator 26 to lower the platform 16 towards the bottom of the container as ice is stored within the container. The rake 18 is operated in the reverse direction to sweep ice product into the container and maintain an even level of product across the width of the container, immediately below the rake 18. When it is desired to discharge ice product from the container 10, a manual switch is activated to reverse the direction of rotation of the rake 18 to the forward direction. If there is an insufficient level of ice built up in the container 10 to engage the rake 18, no load or a low load that is below a predetermined minimum threshold will be applied to the rake drive motor, because the rake 18 will encounter little or no ice. In response to the load being below the minimum threshold, the controller causes the actuator 26 to move the platform 16 upwardly at a continuous speed. Upward movement of the platform 16 continues until the sensor senses that the load being applied to the rake 18 exceeds a predetermined maximum, due to the rake 18 impinging a sufficient quantity of ice while rotating. When the predetermined maximum load level is exceeded, upper movement of the platform 16 ceases, and ice is dispensed by the rotating rake 18 through the discharge chute 30. Depending on the load level, the platform 16 will then either (a) remain stationary for a period of time while ice is discharged; or (b) as soon as the maximum load level is exceeded and upward movement of the rake 16 ceases, the direction of movement of platform 16 is momentarily reversed for a predetermined short period of time, to lower the platform 16 slightly to ensure that there is still sufficient engagement of the ice with the rake 18 for discharge but without overloading the motor 24. In the later instance, once the small incremental movement downward terminates, the platform 16 remains stationary while ice continues to be discharged.

If sufficient ice is discharged that there is no longer enough engagement between the ice and the rake 18 to apply a load greater than the predetermined minimum load threshold on the rake drive motor, the sensor causes the actuator 26 to again move the platform 16 upwardly for further engagement of the ice, until the load level again reaches the predetermined maximum load level. This process continues so long as ice is being discharged. It is possible to simultaneously introduce new ice through the inlet 15 into the container 10 while ice is being discharged. If this results in too much ice being engaged by the rake 18, the torque sensor will accordingly adjust the position of the platform 16 downwardly to ensure adequate engagement without overloading the motor 24.

The apparatus is operated in the opposite manner for filling the container 10. Thus, at any point during the discharge process an operator can switch the device to the storage mode, in which case the rotation of the rake 18 reverses and the platform 16 is moved downwardly to ensure that there is room for additional ice, without the maximum load level being exceeded. During operation of the apparatus, ice can thus be added and withdrawn from the container 10 at will, with the apparatus 10 always automatically ensuring that the level of ice is maintained just below or in engagement with the rake 18 for immediate discharge when desired.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An ice storage and dispensing apparatus, comprising:
   (a) a container defining an inlet aperture for receiving frozen product and an outlet aperture for dispensing frozen product, and first and second ends;
   (b) a platform movably mounted within the first end of the container;
   (c) a rake rotatably mounted within the second end of the container adjacent the outlet aperture;
   (d) an actuator mounted at least partially within the container and operatively connected to the platform to selectively move the platform toward or away from the rake;
   (e) a motor coupled to the rake for driving rotation of the rake;
   (f) a sensor for sensing the proximity and/or the degree of engagement of the frozen product within the container to the rake; and
   (g) a controller for controlling operation of the actuator in response to the sensor to automatically adjust the position of the platform relative to the rake.

2. The ice storage and dispensing machine of claim 1, wherein the sensor comprises a torque sensor.

3. The ice storage and dispensing apparatus of claim 2, wherein the sensor senses a load on the motor.

4. The ice storage and dispensing apparatus of claim 3, wherein the controller responds to sensed loads that are outside of predetermined maximum or minimum loads to automatically adjust the position of the platform relative to the rake.

5. The ice storage and dispensing apparatus of claim 1, wherein the rake is rotatable in a first direction to store the product and in a reverse direction to dispense the product.

6. The ice storage and dispensing apparatus of claim 5, wherein the actuator is reversible to move the platform away from the rake when the rake rotates in the first direction, and toward the rake when the rake rotates in the reverse direction.

7. The ice storage and dispensing apparatus of claim 6, further comprising a switch for switching the direction of movement of the rake and platform.

8. The ice storage and dispensing apparatus of claim 1, wherein the actuator moves the platform towards the rake for dispensing product, and is reversible to move the platform away from the rake for storing product.

9. The ice storage and dispensing apparatus of claim 1, wherein the rake comprises at least one radially extending arcuate arm.

10. The ice storage and dispensing apparatus of claim 9, further comprising ice scraping projections depending from the arcuate arms.

11. The ice storage and dispensing apparatus of claim 1, wherein the rake comprises at least one radially extending arm, the arm defining a lower surface that is substantially aligned with a lower surface of the outlet aperture.

12. The ice storage and dispensing apparatus of claim 1, wherein the platform defines an upper surface that supports the received product, the upper surface defining a contour to engage frozen product and to prevent rotation of frozen product.

13. The apparatus of claim 12, wherein the upper surface defines a plurality of grooves.

14. The ice storage and dispensing apparatus of claim 13, wherein the grooves comprise radial grooves that are in fluid communication with a drain aperture defined in the platform.

15. The ice storage and dispensing apparatus of claim 1, further comprising a fluid seal disposed on a perimeter of the platform for sealing engagement between the perimeter and an interior wall of the container.

16. The ice storage and dispensing apparatus of claim 15, wherein the fluid seal defines a round cross section portion and a flange portion.

17. An ice storage and dispensing apparatus, comprising:
   (a) a container defining an inlet aperture for receiving frozen product and an outlet aperture for dispensing frozen product, and first and second ends;
   (b) a platform mounted within the first end of the container;
   (c) a rake rotatably mounted within the second end of the container adjacent the outlet aperture;
   (d) an actuator mounted at least partially within the container and operatively connected to one of the platform or rake to selectively move the one of the platform or rake toward or away from the other of the platform or rake;
   (e) a motor coupled to the rake for driving rotation of the rake;
   (f) a sensor for sensing the proximity and/or the degree of engagement of the frozen product within the container to the rake; and
   (g) a controller for controlling operation of the actuator in response to the sensor to automatically adjust the position of the one of the platform or rake relative to the other of the platform or rake.

18. An ice storage and dispensing apparatus, comprising:
   (a) a container defining an inlet aperture for receiving frozen product and an outlet aperture for dispensing frozen product, and first and second ends;
   (b) a platform mounted within the first end of the container;
   (c) a rake rotatably mounted within the second end of the container adjacent the outlet aperture;
   (d) an actuator mounted at least partially within the container and operatively connected to either the platform or rake to selectively move the connected platform or rake toward or away from the other of the platform or rake;
   (e) a motor coupled to the rake for driving rotation of the rake; and
   (f) a controller for automatically controlling the actuator in response to a load level applied to the motor.

19. The ice storage and dispensing apparatus of claim 18, wherein the controller responds to sensed loads that are outside of predetermined maximum or minimum loads to automatically adjust the position of the platform relative to the rake.

20. An ice storage and dispensing apparatus, comprising:
   (a) a container defining an inlet aperture for receiving frozen product and an outlet aperture for dispensing frozen product, and first and second ends;
   (b) a platform movably mounted within the first end of the container;
   (c) a rake rotatably mounted within the second end of the container adjacent the outlet aperture wherein the rake rotates in a first direction to store the product and in a reverse direction to dispense the product;
   (d) an actuator operatively connected between the platform and container to selectively move the platform longitudinally toward the rake for dispensing of product and away from the rake for storage of product;
   (e) a motor coupled to the rake for driving rotation of the rake; and
   (f) a switch coupled to the actuator and the motor for reversing movement of the platform and the rake for storage or dispensing of the product.

21. An ice storage and dispensing apparatus, comprising:
   (a) a container defining an interior wall, an inlet aperture for receiving frozen product, an outlet aperture for dispensing frozen product, and first and second ends;
   (b) a platform movably mounted within a first end of the container and defining a perimeter surrounded by the interior wall of the container;
   (c) a fluid seal mounted on the perimeter of the platform for sealing engagement with the perimeter and the interior wall of the container;
   (d) a rake rotatably mounted within the second end of the container adjacent the outlet aperture;
   (e) an actuator operatively connected between the platform and container to selectively move the platform longitudinally toward the rake for dispensing of the product and away from the rake for storage of the product; and
   (f) a motor coupled to the rake for driving rotation of the rake.

22. The ice storage and dispensing apparatus of claim 21, wherein the fluid seal defines a round cross section portion and a flange portion.

23. The ice storage and dispensing apparatus of claim 21, further comprising a drain aperture defined in the platform for melted product.

24. An ice storage and dispensing apparatus, comprising:
   (a) a container defining an inlet aperture for receiving frozen product and an outlet aperture for dispensing frozen product and upper and lower ends;
   (b) a platform mounted within the lower end of the container and defining an upper surface that supports the received frozen product, wherein the upper surface of the platform defines a contour to engage the frozen product;
   (c) a rake rotatably mounted within the upper end of the container adjacent the outlet aperture, wherein rotation of the rake against the received frozen product removes an upper layer of the product for dispensing through the outlet aperture;
   (d) an actuator mounted at least partially within the container and operatively connected to either the platform or rake to selectively move the connected platform or rake toward or away from the other of the platform or rake; and
   (e) a motor coupled to the rake for driving rotation of the rake.

25. The ice storage and dispensing apparatus of claim 24, wherein the upper surface defines a plurality of grooves.

26. The ice storage and dispensing apparatus of claim 25, wherein the grooves comprise radial grooves that are in fluid communication with a drain aperture defined in the platform.

27. An ice storage and dispensing apparatus, comprising:
   (a) a container defining an inlet aperture for receiving frozen product and an outlet aperture for dispensing frozen product;

(b) a platform movably mounted within the container;

(c) means for moving the platform;

(d) a rake rotatably mounted within the container adjacent the outlet aperture;

(e) means for rotating the rake; and (f) means for automatically adjusting the position of the platform relative to the rake in response to the proximity and/or degree of engagement of the frozen product within the container to the rake.

28. An ice storage and dispensing apparatus, comprising:

(a) a container defining an inlet aperture for receiving frozen product and an outlet aperture for dispensing frozen product, and first and second ends;

(b) a platform mounted within the first end of the container;

(c) a rake movably mounted within the second end of the container adjacent the outlet aperture and movable against the received product to remove a layer of product for dispensing through the outlet aperture;

(d) an actuator mounted at least partially within the container and operatively connected to either the platform or rake to selectively move the connected platform or rake toward or away from the other of the platform or rake;

(e) a motor coupled to the rake for driving movement of the rake;

(f) a sensor for sensing the proximity and/or degree of engagement of the frozen product within the container to the rake; and (g) a controller for controlling operation of the actuator in response to the sensor to automatically adjust the position of the one of the platform or rake relative to the other of the platform or rake.

29. A method of storing and dispensing ice, the method comprising:

(a) receiving frozen product through an inlet aperture of a container onto a movable platform mounted within the container;

(b) selectively rotating a rake mounted within the container in a first direction for dispensing frozen product through an outlet aperture of the container;

(c) sensing the proximity and/or degree of engagement of the frozen product within the container to the rake; and (d) automatically moving the platform toward or away from the rake in response to the sensed relationship of frozen product to the rake.

* * * * *